(12) United States Patent
Campbell et al.

(10) Patent No.: US 8,930,295 B2
(45) Date of Patent: Jan. 6, 2015

(54) SYSTEMS AND METHODS FOR MONITORING AND ANALYZING TRANSACTIONS

(76) Inventors: Stanley Victor Campbell, Vienna, VA (US); Stanley Victor Campbell, III, Vienna, VA (US)

(*) Notice: Subject to any disclaimer, the term of this patent is extended or adjusted under 35 U.S.C. 154(b) by 233 days.

(21) Appl. No.: 13/612,759

(22) Filed: Sep. 12, 2012

(65) Prior Publication Data
US 2014/0074762 A1 Mar. 13, 2014

Related U.S. Application Data

(60) Provisional application No. 61/533,594, filed on Sep. 12, 2011.

(51) Int. Cl.
*G06F 17/00* (2006.01)
*G06N 5/02* (2006.01)
*G06Q 40/00* (2012.01)

(52) U.S. Cl.
CPC ............... *G06N 5/022* (2013.01); *G06Q 40/00* (2013.01)
USPC .......................................................... 706/46

(58) Field of Classification Search
USPC .......................................................... 706/46
See application file for complete search history.

(56) References Cited

U.S. PATENT DOCUMENTS

| 8,385,971 | B2* | 2/2013 | Rhoads et al. | 455/556.1 |
|---|---|---|---|---|
| 8,468,244 | B2* | 6/2013 | Redlich et al. | 709/225 |
| 8,755,837 | B2* | 6/2014 | Rhoads et al. | 455/556.1 |
| 8,768,313 | B2* | 7/2014 | Rodriguez | 455/414.1 |
| 2003/0069760 | A1 | 4/2003 | Gelber | |
| 2003/0083903 | A1 | 5/2003 | Myers | |
| 2005/0137910 | A1 | 6/2005 | Rao | |
| 2009/0138415 | A1* | 5/2009 | Lancaster | 706/11 |
| 2009/0210251 | A1 | 8/2009 | Callas | |
| 2009/0254572 | A1* | 10/2009 | Redlich et al. | 707/10 |
| 2012/0166212 | A1* | 6/2012 | Campbell | 705/2 |
| 2014/0074762 | A1* | 3/2014 | Campbell | 706/46 |

OTHER PUBLICATIONS

International Search Report dated May 14, 2012.

* cited by examiner

*Primary Examiner* — Michael B Holmes
(74) *Attorney, Agent, or Firm* — Symbus Law Group, LLC; Clifford D. Hyra (57) ABSTRACT

A system for performing FRIAR Code-based adjudication includes a FRIAR Code processor configured to match an extracted FRIAR identified element against a Knowledge Base set of reference FRIAR identified elements, a FRIAR Transaction Originator Code processor, a FRIAR Account Code processor, a FRIAR Code selection processor for defining a rule set to be applied to the extracted FRIAR identified element and the large indefinite quantity of reference FRIAR identified elements and configured to generate a total FRIAR Code identification function, a FRIAR Code threshold processor configured to generate a context-dependent threshold for an acceptable code decision, and a decision processor configured to compare the total FRIAR Code functions to the context-dependent threshold and determine whether to accumulate and aggregate further FRIAR Code aggregation, provide system alerts, render an automatic reclassification, or to generate an auto-accept/auto-deny decision-result.

19 Claims, 3 Drawing Sheets

SYSTEMS AND METHODS FOR MONITORING AND ANALYZING TRANSACTIONS

This application claims the benefit of U.S. Provisional Application No. 61/533,594, filed Sep. 12, 2011, which is hereby incorporated by reference in its entirety.

FIELD OF THE INVENTION

The present invention relates generally to data (predictive) analytics, pattern recognition, anomaly detection, and more particularly to Artificial Intelligence, rules, algorithm, and statistical formulary-driven Context Sensitive Structured Virtual Construct involving machine-based run-time accounting activity logging, knowledge-based information management, and temporal and geospatial context for performing code-based adjudication of finance and accounting processing through persistent reconciliation and business activity monitoring of accounting, enterprise resource planning (ERP) and other finance and logistics applications.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

A new system for performing Financial Records, Infrastructure and Accounting Reconciliation (FRIAR) Code-based adjudication includes a FRIAR Code processor, configured to match an extracted FRIAR identified element against a Knowledge Base set (KBS) of reference FRIAR identified elements (RFIE), a FRIAR Transaction Originator Code processor, configured to match an extracted FRIAR identified element associated with Transaction Originator identification against a Knowledge Base set (KBS) of reference FRIAR Transaction Originator identified elements (RF-TOIE), a FRIAR Account Code processor, configured to match an extracted FRIAR identified element associated with the Account Name of Record (ANR) against a Knowledge Base set of reference FRIAR Account identified elements (RMAcIE), a FRIAR Code selection (ACS) processor for defining a rule set to be applied to the extracted FRIAR identified element and the large indefinite quantity (LIQ) of reference FRIAR identified elements and configured to generate a total FRIAR Code identification function, a FRIAR Code threshold processor configured to generate a context-dependent threshold for an acceptable code decision, and a decision processor, configured to compare the total FRIAR Code functions to the context-dependent threshold and determine whether to accumulate and aggregate further FRIAR Code aggregation, provide system alerts, render an automatic reclassification, or to generate an auto-accept/auto-deny decision-result.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

Systems and methods for monitoring and analyzing transactions will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A new Context Sensitive Structured Virtual Construct (CS-SVC) performs Financial Records, Infrastructure, and Accounting Reconciliation (FRIAR) and Business Activity Monitoring (BAM) through Persistent Code-Based Adjudication (PCBA) of Finance and Accounting Ledger processing outcomes.

The system uses a code-based financial ontology for differing market segments to monitor and analyze financial data. This code-based ontology might, for example, have the broadest classifications of financial data at the highest level and then narrower and more focused classifications for specific market segments nested under those broader categories. So code 10000 might indicate personal finance, code 20000 corporate finance, code 30000 public finance, while code 21000 may go a level down and indicate a sub-category within the corporate finance category, e.g. corporate bonds, while code 22000 may indicate corporate equities, code 23000 corporate taxation, etc. Code 22100 might be a sub-sub-category relating to IPOs, code 22200 to stock buybacks, code 22300 to hostile acquisitions, code 22400 to generic stock purchases and sales, code 22500 monetary transactions with 22550 establishing European currency transactions, code 22551 transactions as British/FT etc. This is merely a very simple example ontology and in practice the ontology may be quite complex, with many thousands of interlinked codes and a variety of possible formats. The ontology need not be a top-down hierarchy, but rather can have links between codes at various levels and branches of the ontology. The codes used in this system are referred to as FRIAR codes.

These codes may be input as a starting point for the system, or a set of codes can be gathered automatically from historical or reference data, with new codes added as the system processes additional information or data. Ontology and taxonomy may be automatically generated during indexing (data harvesting) and may be explicitly formed by using an existing Ontology (as with medical billing codes in the health care realm). An existing Taxonomy may be purchased (like the NIH Medical Taxonomy or the FDA Drug Taxonomy in the health care realm), however when the data enterprise is harvested the system pulls specific terms into associative clusters from the documentation provided as a part of a machine learning process. These associative clusters show the relationship between various elements and can be used to build or add to an ontology and taxonomy. For example, during data extraction the system may find various currency abbreviations (GBP, CHF, USD, AUD, etc.) clustering both within and between transactions, where the transactions that share these terms also share other currency-transaction-related terms like "pips", "carry trade", "exchange rate", "currency", etc. These terms would then be grouped together under a code for currency transactions and connections would be drawn between these terms and the other currency-related elements. In this way, an entire ontology may be constructed automatically from scratch during a data harvesting and machine learning process.

The system may make use of the code-based ontology in a variety of ways. It may use the codes to classify transactions input into the system and organize them for review or storage, or it may use the coding to make various determinations regarding input data. For example, anomalous data might be detected by conflicting code matches within data for a single transaction or between multiple related transactions, or fraud might be detected when codes relating to fraudulent financial transactions are matched to input data.

FRIAR codes may be matched to input data at multiple levels—such as at the level of individual data elements, at the level of an individual transaction, at the level of a group of transactions, etc. The matching is typically conducted from the bottom up, so the classifications of the individual elements allow for classification of the transaction as a whole, and classification of transactions allow for classification of a group of related transactions, etc. So for example, the system may receive data relating to a transaction, and individual elements may be extracted from this data, such as "defense," "acquisition," and "for service." Although the example elements are recognized as key words that may help to distinguish between one type of finance and another, other data elements such as contextual elements relating to e.g. time and place of the transaction may also be extracted and utilized to form the context of the content or transaction. Each of these elements, through methods generally described in detail below, making use of rules, statistics, and algorithms, may be matched to various FRIAR codes with certain confidence and weighted guidelines. So, "defense" might be matched to codes relating to defense contracting, weaponry, DARPA, etc., with varying confidence levels, "acquisition" may be matched to codes for government contracting and purchase orders, "for service" might be matched to codes for service contracts and procurement, etc. The system may then consider each individual element's matched codes and weightings, the relation between the matched codes, and codes matched to combinations of elements (e.g. "defense+acquisition"), to arrive at codes matched to the transaction as a whole, for example "DoD request for proposal for [X] service".

In an aspect, the methodologies, systems, and apparatuses disclosed herein apply statically based analysis in conjunction with the specific application of algorithms relating plausibility and potentiality of accuracy to form system baselines and the dynamic update of those baselines for determining whether a given FRIAR code is accurate.

FRIAR code analysis may be similar in some ways to classification and analysis of medical billing transactions, in that within medical billing there is a code-based classification system that can be utilized. However, the overall structure of the analytics differs greatly between financial and medical billing transactions. Medical billing analysis is primarily explicit analysis fitting transactions into medical billing codes dictated by an outside entity. Finance on the other hand is mostly implicit, and codes and relationships must be generated organically and used to determine a variety of different types of questions such a detecting the presence of fraud, verifying accounting relationships, determining key market actors, etc.

As used herein, the phrases "reclassify", "auto-reclassify", "auto-reclassification", and "automatically reclassify" shall all refer to a command to change a target FRIAR code to a different, more appropriate code.

As used herein, the phrase "authorize", "accept", "auto-accept", and "automatically accept" shall refer to a command to accept a given FRIAR code as probably valid to a degree of confidence as defined by the rule set.

As used herein, the phrase "deny" and "auto-deny" shall refer to a command to deny a given FRIAR code as probably invalid to a degree of confidence as defined by the rule set.

As used herein, the phrase "FRIAR identified element" shall refer to any information associated with a given financial event.

As used herein, the phrase "FRIAR code identified element" shall refer to any information associated with a FRIAR code in a given financial transaction, including but not limited to an indication, a categorization, or any other information used to support the assignment of the FRIAR code to the financial transaction.

As used herein, the phrase "transaction originator identified element" shall refer to an identified element associated with a given financial transaction originator.

As used herein, the phrases "reference identified element" shall refer to an identified element in a set of identified elements associated with historical financial transactions, against which an extracted FRIAR identified element may be compared to determine a probability of whether the extracted identified element is properly associated with the FRIAR code. The reference identified elements may be drawn from a knowledge base of compiled identified elements associated with various codes, or may be generated dynamically from one or more external data sources.

As used herein, the phrase "Rules Set" shall refer to a pre-programmed set of rules applicable to content or appliances, to follow for determining whether a given FRIAR identified element supports or refutes a proposition that a given financial transaction should be approved, disapproved, or reclassified.

As used herein, the phrase "large indefinite quantity" shall refer to any quantity of information generated dynamically from at least one data source, such that the quantity of information is sufficient to raise the level of confidence regarding a given decision. In an aspect, the "large indefinite quantity" may be derived from the total number of transactions processed by the system for a given time period. In a further aspect, the large indefinite quantity is continuously adjusted until the confidence is raised above the threshold level.

A context-sensitive technology and methodology, a Structured Virtual Construct (SVC) software system, data tagging techniques, and an apparatus are defined and used in performing FRIAR Code-based adjudication, which performs Business Activity Monitoring (BAM) within and external of journals and ledger accounts for assets (including receivables and inventories), liabilities, capital, income, and expenses, involving the matching of given FRIAR-identified elements associated with standard transactions of double-entry accounting cycles against one or more of a set of known or reference FRIAR-identified elements from history or other data elements, using an artificial intelligence-managed set of rules and algorithms to evoke decision tree analysis. A satisfactory decision is achieved as a function of both aggregated ranking (AR) and account adjudication (AA), where account adjudication refers to the full set of values and variables garnered by the FRIAR Code accumulation process in the process of generating approval/denial/re-classification of FRIAR account reconciliation and/or claim events. AA is the model containing all the information needed to answer the particular question being asked or monitor the specific event type of the system. AA may be a first step when data and instructions are received. Before processing the data, a model containing the information used to satisfy the instructions is developed. For example (outside the financial domain), the system might be asked for the best quarterback within the set of quarterbacks and related data fed into the system. Before analysis, the system conducts AA to select the relevant values and variables for answering the designated question. So the AA might select a model utilizing Wunderlic score, time in the 40-yard dash, height, college pass completion percentage, etc., and may define some optimal value set for those variables or optimal relation between them in order to process and judge the input data.

Aggregated ranking is a mechanism to set the various correlation adjudication values, weighting, and context where thresholds rules, and algorithms define acceptable adjudication parameters and models for transaction event adjudication. When there are multiple candidates for a given overall determination (e.g., best available college quarterback) aggregated rankings order the candidates from overall most likely to fit the determination to least likely, based on whatever model factors for form, fit and function are selected in AA. This AR may be scored against a static or dynamic (e.g. moving average) baseline.

FRIAR Code aggregated ranking is computed on the basis of partial matching of feature vector elements, where separate and distinct feature vectors are associated with both the given FRIAR identified element and each of the reference FRIAR identified elements. A feature vector is a distance, in a data set represented in multi-dimensional space, between a known and trusted data point and a new data point. Distance from known and trusted data points may indicate unreliability or lack of usefulness as a predictor (and vice versa), and thus more weight may be applied in aggregated rankings to the elements closest to trusted data points. However, in certain cases distance from trusted data points may indicate an anomalous outlier that deserves attention.

Following FRIAR Code-combination methods, account reconciliation, or symptom/indicator descriptivism, FRIAR Codes are accrued for both approval and denial decisions regarding a potential match. Code-combination methods determine whether a certain combination of different element codes is unique to a certain higher level code/category. For example, only currency transactions may include a combination of element codes for USD, CHF, pip spreads, carry trade, etc. Account reconciliation methods match credits and debits—i.e. every sell transaction should have a counterparty buy transaction, every loan liability should have a matching asset infusion, etc. Indicator descriptivism matches a combination of element codes to a transaction state—for example, a lack of a second party, no change in funds, and no movement in price may indicate that the transaction is a failed or unfilled transaction.

FRIAR Code event (FACE) profiles are models generated to relate outcomes (final determinations) to inputs. For example, a simple FACE profile might relate an announcement of jobs growth greater than 120,000 with an up market period and job growth of less than 110,000 with a down market period. FACE profiles are organized to specific individual or multiple correlating Ontologies with rules structure modeled for the domain's expert functionality and may be used to recommend, alert and/or track FRIAR cost, outcomes, transactions and trends based on pre-described statistical or governance parameters. Account categories are persistently monitored for attribute accuracy, context and duplication against explicit data models and may be alerted or reported in conjunction with any financial modeled parameters.

—Example: an organization's balance sheet and income statement, including year-end closing entries, may be indexed, categorized, classified, normalized, de-duplicated, tracked, scored, extrapolated, modeled or otherwise analyzed with multiple algorithms, statistical and rules models as a function of the aggregation of Business Activity Monitoring. The same system may be configured in reverse to take the end item balance sheet and income statements to serve as the baseline for the projection of transaction activity as a predicted forecast from the model of formulated market allocation models and ontologies formed to mimic the balance sheet and income statement transaction activity.

According to one embodiment of the invention, a system for performing FRIAR Code-based adjudication comprises an FRIAR Code processor, configured to match an extracted FRIAR identified element against a set of reference FRIAR identified elements; a FRIAR transaction originator Code selection processor for defining a rule set to be applied to the extracted FRIAR Transaction Originator identified element and the large indefinite quantity of reference FRIAR Transaction Originator identified elements and configured to generate a total FRIAR Transaction Originator Code function; a FRIAR Account Code selection processor for defining a rule set to be applied to the extracted FRIAR Account identified element and the large indefinite quantity of reference FRIAR Account identified elements and configured to generate a total FRIAR Account Code function; a FRIAR Code selection processor for defining a rule set to be applied to the extracted FRIAR identified element and the large indefinite quantity of reference FRIAR identified elements and configured to generate a total FRIAR Code function; a threshold processor configured to generate a context-dependent threshold for an acceptable decision and a decision processor, configured to compare the total FRIAR Code function (current code estimate for the overall transaction) to the context-dependent threshold and determine whether to accumulate and aggregate further FRIAR Codes or to generate a decision-result. For example, the system might adjust the coding relevance or sequence of additional individual elements if the elements analyzed so far result in a code determination for the transaction as a whole to a certain degree of certainty. Subsequent FACE profiles are used to track FRIAR outcomes and trends. Human Feedback is employed to enhance automated system learning. The Account may be the transaction tool used to carry out a given input transaction, for example a certain financial company carrying out the transaction.

A FRIAR service is a determination based on the complete adjudication of a transaction model through the finite element analysis of multiple distributed transaction components interacting as an operational service bundle where two or more ontology networks are involved. The primary market model and ontology serves as the explicit lead for transaction resource models, while the FRIAR activity level of analytic representation is responsible for creating and managing the global transaction interaction which encompasses all operations against the transaction resources. Transactions are monitored through a distributed network of models where new transactions are measured and organized into categories of atomicity, consistency, isolation, durability (ACID) properties based on their market tracks and where atomicity does not require an all-or-nothing transaction model to assure a useable and accurate outcome.

Known and Trusted data is used to augment transactional resources where a specific transaction element may span across multiple market models. In this case, the distributed transaction adjudication models are used to synchronize ACID properties among multiple participating market models and disparate databases. The isolation property of the ACID functionality is therefore positioned as a mobile asset for multi-database transactions which require global serialization, thus avoiding the need for the normal two phase locking for concurrent control to ensures global serialization. This function serves as the entry passport for relational database structures to be aggregated, analyzed and modeled into intelligent objects which may then be analyzed and used in object level analysis. This function may incorporate many common algorithms for use in ensuring correct completion of distributed transaction analysis.

FRIAR functionality for complex event analysis involve multiple undo levels and do levels to perform specific functions and operations through rules and statistical models without human intervention. A FRIAR service may be approved, indicating that a given transaction (or element, etc.) is appropriately coded, denied, or recalculated indicating that a given transaction (or element, etc.) is not appropriately matched to a given code or model. The reclassification may be provided given the systematic determination that a more appropriate code exists for a given transaction or element. FRIAR Service approval/deny methods may have at least the following: a FRIAR Code accumulation method or system for incrementally aggregating information until a satisfactory decision can be reached, where this method yields both degrees of approval and denial for any given FRIAR Service, as well as to indicate when an aggregated FRIAR Code combination can authorize, reclassify or deny a given FRIAR Service, or map "Rules, algorithms, and/or statistical baselines Conflict" related to the specific FRIAR Service.

The system may have an ability to deal with partially complete and/or partially erroneous FRIAR Codes, as part of the FRIAR Code accumulation method, both associated with the extracted FRIAR identified element and with the reference FRIAR identified elements to which the extracted FRIAR identified element is compared for FRIAR Service resolution by scoring the partial analysis result for statistical significance and applying a weighting as a function of the score as a determinant of the plausibility and potentiality of the event model according to a pre-determined threshold probability which establishes the significance level of the analysis. In Business Activity Monitoring such as Stock Trading, the functions frequency probability is constantly updated because the approach uses decisions which are almost always made using null-hypothesis tests for different variations of available data. Here, statistical model combination testing is a key technique of FRIAR statistical inference scoring. The system may use statistical allocation scoring, rules-based analysis scoring and algorithmic scoring such as the Bayesian approach to hypothesis testing where the base rejection of the models scoring serves as a function of the posterior probability. Other approaches to reaching a decision based on data available may be based on decision theory scoring and optimal decision models.

Partial analytic profiling given an incomplete set of data elements may be performed given the statistical, rules, and algorithmic based model's reference to the weighting as guidelines for each element. Probabilities are provided based on the information provided and normalization is calculated to complete the process. The system may also be designed to make recommendations for enhancement of the results through the announcement of the missing elements which, if provided, will complete the model and analytic process.

This FRIAR Code announcement and selection method or system for selecting the "reclassification" and recalculation of a transaction model identifies the type of FRIAR Code to both access and aggregate the final assessment or alert in order to form the next step of aggregated FRIAR Code analytic model. The system models serve to either authorize, reclassify or deny a FRIAR Service, where the means for such selection addresses both the potential "maximal usefulness" that a given piece of FRIAR Code could provide.

As one example, this invention addresses the case where a FRIAR identified element (person, organization, place, object, FRIAR code event, etc) is extracted from text-based data sources. There are already many methods and capabilities for performing noun and noun phrase parsing. For purposes of this invention, they will be assumed to provide an acceptable set of extracted FRIAR identified elements which may further already be identified, using one or more of several means known to practitioners of the art, as being a person, place, thing, etc. FRIAR is designed to augment this portion of the data harvesting, indexing, classification and categorization function through the use of statistical co-occurrence and semantic processing algorithms.

Illustrative, although by no means limiting, examples include the following: A person purchases FRIAR Services and gives certain identifying information. How can it be verified that the "identifying information" supplied by and about this person sufficiently matches some known person (the "reference FRIAR identified element") and can be judged not to match other possible "reference FRIAR identified elements?"

The goal of FRIAR as a Service denial is to minimize the number of false denials resulting from making a given assertion, e.g., with regard to extracted FRIAR identified element evaluation. Thus, it is sometimes more important to ascertain that a given extracted FRIAR identified element is not a match to certain reference-list of known and trusted FRIAR identified elements than it is to approve and match the same extracted FRIAR identified element to a reference FRIAR identified element. A FRIAR reference element may be a FRIAR code, model, rule triggering an analytic function, or the like.

In the case of the first example above, once a Transaction Originator or Account has been associated with some known reference FRIAR identified element (e.g., as an example from the NASDAQ and/or NYSE employment transaction history files and one or more commercial data sources, the system will either confirm or deny that the individual involved in the specific transaction is the same person as identified in known "Fraud or un-approved vender/Account list?"

In the case of the second example above, Fraud-list matching, it is possible that not only should the person or vendor be screened against (i) known Fraud List persons, but also (ii) their potential for "non-obvious relationships" to potentially fraudulent transactions within or spread between various transaction originators.

Refuting a match between an extracted FRIAR identified element and a key reference FRIAR identified element is important in determining the significance of material associated with the extracted FRIAR identified element.

The tasks to which this methodology may be applied may involve the following constraints: The a priori probability distribution of the feature vector values may be unknown, and a priori dependence of the extracted FRIAR identified element association to a reference FRIAR allowable identified element, resting on a given set of feature vector values, may be difficult to compute, and the number of possible competing FRIAR rules, algorithms, and/or statistical baselines Code Options, and the effort needed to distinguish an acceptable match to a specific FRIAR Service (verifying one FRIAR Service and refuting others), can be very difficult to specify in advance.

Furthermore, depending on the circumstances it may be desirable to satisfy one or more of the following objectives: FRIAR Code accumulation should be traceable, different kinds of FRIAR Code can be associated with both the extracted FRIAR identified elements and the reference FRIAR identified elements, so that no single "path" for FRIAR Code matching will always be available; instead, multiple FRIAR Code combinations may not only be possible but necessary. FRIAR Code items (feature vector elements) associated with either or both the extracted FRIAR identified elements and/or the reference FRIAR identified elements may be partial or incomplete, and yet partial matches between these FRIAR Code items will contribute to a quantifiable degree of FRIAR Code accumulation and assessment in both re-classification and conflict in potential decisions/assignments and will be represented explicitly. There should be a defined means for accumulating additional FRIAR Code to support potential assertions, to allow a "minimal" set of rules, algorithms, and/or statistical baselines for obtaining FRIAR Code can be applied (assuming that each "FRIAR Code unit" carries an associated quantifiable processing function), and there should be a means to cut-off further FRIAR Code accrual after sufficient FRIAR Code has been obtained to support a given assertion, while re-classification and/or conflict about this assertion are within acceptable and defined limits. These limitations may be set by the deployment authority's governance model as augmented by the parties' agreement.

While the need for a decision tree governing selection of pair wise elements for combination can require development of a substantial rules, algorithms, and/or statistical baselines set to cover all the possible cases for obtaining different FRIAR Code combinations, this is actually proven to be an advantage in the sense that each time a FRIAR Code-unit is requested from a specific source, it is possible to pre-compute the additional cost. The FRIAR Code unit may come as an individual data element, as a rule, or as a statistical-based guideline. It is also possible to specify in advance how much a given additional form of FRIAR Code will be allowed to contribute to the total approval ranking. This means that cost/benefit tradeoffs for collecting different forms of FRIAR Code from different sources can be assessed, leading to a rules, algorithms, and/or statistical baselines set governing FRIAR Code-gathering.

Aggregated ranking can also be used to address benefit, as an indirect function of risk Account adjudication, as used in this approach, defines the parameters and certainty that a given assertion is true related to the approval. Additionally, the degree to which it is credible that a given assertion could come from Trusted Knowledge Base information is directly proportional to the degree of accuracy in the account adjudication for approval, re-classification, and denial. The presence of a re-classification measure makes it possible to express the adjudicated model results with a higher confidence and accuracy as compared to results not augmented by FRIAR Knowledge based elements.

A key to the system is how well it processes and adjudicates finance and accounting from historical and organizational data at rest (stored data); how effectively it is able to adjudicate this data in motion (transactional data and queries) ranging from assisting a transaction originator with FRIAR Coding assistance to pre-processed Finance and Accounting; and finally the means and methods that it utilizes to "Approve, Deny, or Re-Classify" its associated claim in an automated fashion for management monitoring of the decision making process. While infrastructure is instrumental, ultimately it is the aggregation of dollars saved, the reduction of false approvals, the scalability of the system, the secure storage and movement of data, and the reports and measures to the end user which enables proper decision making. The technology therefore may include a unique extract, transform, and load approach to data management which provides a logical, structured means of data management that applies to both pre- and post-processed FRIAR Coding and Finance and Accounting Processing.

The technology, process, and procedure can be used to create and measure similar Knowledge Base sets (KBS) of reference elements (RE); a Transaction Originator Code processor (TOC), configured to match an extracted context-identified element associated with Transaction Originator identification against a Knowledge Base set (KBS) of referenced, Financial, Logistical, Operational and numerous other Transaction Originator or User identified elements where a Code processor, configured to match an extracted identified element associated with a Person, Place, or Thing against a Knowledge Base set of reference identified elements require adjudication and analysis through a Code selection processor, where the user identified element provides the algorithmic stability within the KBS and the computational machine learning algorithm is linked by extracted inputs. The stable learning algorithm is one for which the connection between coding and matching of extracted elements with the KBS referenced elements are used to extend the enterprise.

For example, a machine learning stability algorithm is being trained to recognize financial transaction fraud through the coding of a model, and a rules structure based on 1000 examples of transaction fraud and their fraud types as a training set. In this case if a new type of transaction fraud is introduced through an extracted identified element, so there are now 1001 examples of financial fraud, the stable learning algorithm may produce a similar classifier from the connection between the coding and the extracted element with both the minimum of the 1001-element and 1000-element training sets. The defining rule set as applied to the extracted identified element and the large indefinite quantity (LIQ) of reference data elements all serve as enhancements to multi level connective analytics. Here, the content is encoded in the indexing process in as a means of enabling the affect of search algorithms. In particular if a Knowledge based variable width encoding is in use then proportional analysis is performed, then the character association is completed. This function is specifically designed to significantly increase the more advanced search algorithms at the semantic level through the sequencing of code units, thus reducing the production of false matches as an encoding function specifically designed to avoid false positives. System speed and functionality is enhanced by the avoidance of multiple retracing of FRIAR element backtracking by the construction of the deterministic finite element analysis functions that are modeled to recognize patterns containing the desired model elements. Here the use of feature vectors is also intended to quantitatively find and measure a "closeness" score between the model and the indexed content for "match/non-match" considerations. These functions differ significantly from typical "fuzzy logic" functionality because they are designed to work in conjunction with rules, statistics and other algorithms.

The system may act as a fraud, risk, finance and accounting adjudicator for all segments of commercial and government transactions. This approach and technology advances all existing FRIAR Finance and Accounting analytic techniques and is transferable to all applications which utilize such elements as neural networks, Boolean discovery, Bayesian inference, statistical and analysis artificial intelligence methods, which may or may not use enabling object-oriented or real time detection of normal and unusual patterns and behavior in billing, finance and accounting, provisioning, events and outcomes. Commercially, the predictive analytics capability adjudicates risk and fraud in any financial and risk-based adjudication processor.

The new approach advances existing FRIAR Finance and Accounting analytic techniques which utilize such elements as neural networks, Boolean discovery, Bayesian inference, statistical analysis and artificial intelligence methods by enabling object-oriented real time detection of normal and unusual patterns and behavior in FRIAR billing, Finance and Accounting, provisioning, events and outcomes. Commercially, predictive analytics adjudicate risk and fraud in persistent reconciliation, care and insurance systems through FRIAR Code-based adjudication systems including a FRIAR Code processor configured to match an extracted FRIAR identified element against a Knowledge Base set (KBS) of reference FRIAR identified elements (RFIE); a FRIAR Provider Code processor, configured to match an extracted FRIAR identified element associated with Provider identification against a Knowledge Base set (KBS) of reference FRIAR Provider identified elements (RFAcIE); a FRIAR Account Code processor, configured to match an extracted FRIAR identified element associated with the Account Name of Record (ANR) against a Knowledge Base set of reference FRIAR Account identified elements (RMPaIE); a FRIAR Code selection (ACS) processor for defining a rule set to be applied to the extracted FRIAR identified element and the large indefinite quantity (LIQ) of reference FRIAR data elements.

A Context-sensitive Structured Virtual Construct performs FRIAR Code-based Business Activity Monitoring and adjudication from Finance and Accounting processing to persistent reconciliation outcome. It solves the problems of large scale FRIAR claim, account, and transaction error, omission, fraud, waste, and abuse (FWA) through analysis and reporting of context-sensitive FRIAR, billing, Finance and Accounting, provider, and Account data. It also provides a capability to forecast, track, and report FRIAR Code-based adjudication and outcomes involving the matching of FRIAR-identified elements against one or more of a set of known or reference FRIAR identified elements involving FRIAR account reconciliation and/or claim events. It defines acceptable adjudication parameters for adjudication and aggregated ranking.

The system may be used to identify, model and aggregate common Market elements for
Analysis and Testing of Contextual Hypotheses of the Gaussian copula family of models augmented by quantification of primary assumptions and the "Greeks", which are used in finance to estimate the probability distribution of losses on a disparate pool of financial transactions. The Greeks are quantities representing the sensitivities of the price of derivatives such as options to a change in underlying parameters on which the value of an instrument or portfolio of financial instruments is dependent. Most of these sensitive are denoted by Greek letters, hence the use of the name "The Greeks". The Greeks are also referred to as risk sensitivities, risk measures, or hedge parameters.

The impact of the system is anticipated to range from the Libor scandal series of fraudulent actions connected to the London Interbank Offered Rate, where the Libor average interest rate is calculated through submissions of interest rates by major banks in London to the domestic loans, to bonds transactions which were centrally involved in the credit crisis. Historically these financial transactions and the associated modeling draw upon articulation between two distinct, cross-cutting forms of social patterning in financial markets which are extrapolated across numerous Market Channel environments both domestically and internationally. (Simply put, for Libor 15 actors set market rates for the world.) First, organizations such as banks, brokerage firms, and funds operate under well-established evaluation Operational, Logistical and Transactional cultures which are performed through shared sets of material patterns of practice, institutional and individual preferences and operational beliefs as represented within the culture of multiple organizations. The use of these Gaussian models as articulated within these markets have developed critical inter and intra co-dependencies and related organizational coordination, while Market Regulators (the SEC, FED, CFTC . . . ) simultaneously use both the industry Market Baselines as formed by Dominant Players within the specific Market along with the same Gaussian-based tools used by the Dominant Players thus creating a culture of "no-arbitrage modeling" and "no-arbitrage monitoring."

The far reaching elements of the new approach extends computational linguistic, advanced analytics utilizing Rules based analysis, Algorithms and Statistical baseline models along with social network analysis to document the speculation that all widely-used banking, currency, derivatives and other Market models have either co-existing commonalities, co-mingling elements, common evaluation cultures, inter-organizational coordination and numerous variations with respect to Gaussian copula models which do differ with geospatial and temporal contextual variants. Ontological commonalities are identified and mapped across all major markets along with the cross domain correlation of Market-specific Taxonomies to serve as the baseline for powering a persistent monitoring, analysis and alerting tool that is able to conform to Market specific focus within a single enterprise environment. This work is useful as both a strategic enterprise tool as well as a tactical tool.

This capability provides the very first cross-domain analytic and monitoring tool which can monitor and alert on varying Markets utilizing both the assumption that an asset pricing model that models an underlying random risk with the Gaussian copula which takes market price as an input rather than trying to output a fair market value, thus allowing the system to come up with an implied correlation, through the buying or selling of the asset, thus allowing alerting on the "buy" or "sell" correlation. Additionally, the system may provide the first capability to avoid human dependency of the analyst getting too accustomed to thinking in implied correlation space. As evidenced by the financial crises over the past 5 years, humans can learn to gloss over the assumptions that underpin models, and when these assumptions stop holding up well, a rapidly unraveling disaster scenario can ensue. The Gaussian copula is a statistical functional element which provides an approximation of a complex relationship within a Market segment. Many if not all Market segments may be cross-correlated. It is not normally compared to or statistically associated with Black-Scholes or other similar models which provided traders with a means to consider and price risk in an option pricing model that provides a way to re-express option prices in terms of a volatility parameter in an analogous manner to the implied correlation as described.

Copula probability and statistics distribution functions are used to describe the dependence between random variables. The cumulative distribution functions of random feature vectors may be written in terms of marginal distribution functions based on a CFTC Market focused copula. The marginal distribution functions of each component of the random vectors and the copula along with the notional relationships may be described in a dependence structure between the components.

Copulas may serve as statistical applications which model and estimate the distribution of random vectors by estimating margins and copula separately. Market Parametric models may be generalized where the Gaussian copula for the individual Market Segments are represented as a distribution over the unit cube $[0, 1]^d$. They may be constructed from multivariate normal distributions over $\mathbb{R}^d$ using the probability integral Fourier transform. For a given correlation matrix $\Sigma \in \mathbb{R}^{d \times d}$, the Gaussian copula with parameter matrix $\Sigma$ can be written as $$C_\Sigma^{Gauss}(u) = \Phi_\Sigma(\Phi^{-1}(u_1), \ldots, \Phi^{-1}(u_d)),$$

where $\Phi^{-1}$ is the inverse cumulative distribution function of a standard normal and $\Phi_\Sigma$: is the joint cumulative distribution function of a multivariate normal distribution with mean vector zero and covariance matrix equal to the correlation matrix $\Sigma$.

The density can be written as $$C_\Sigma^{Gauss}(u) = \frac{1}{\sqrt{\det \Sigma}} \exp\left(-\frac{1}{2} \begin{pmatrix} \Phi^{-1}(u_1) \\ \ldots \\ \Phi^{-1}(u_d) \end{pmatrix} * (\Sigma^{-1} - I) * \begin{pmatrix} \Phi^{-1}(u_1) \\ \ldots \\ \Phi^{-1}(u_d) \end{pmatrix}\right),$$

where I is the identity matrix. These Gaussian formulas are text-book and referenced only as an example. Any number of copulas, such as Monte Carlo copulas, may be substituted depending on the desired application.

Assumptions may be modeled from a Predictive Analytic functionality where Plausibility and Potentiality serve as a computational measure in Hypotheses Generation and Persistent Adjudication.

In a method of belief verification in the cloud, Dempster-Shafer may be used for evidence combination. In an initial state (for financial business activity monitoring ontology), there is no initial belief or initial disbelief in ID validity and high uncertainty. In a first step, one evidence item is added and evidence combination is performed. Belief grows substantially as belief from evidence associated to ID validation. Disbelief increases marginally as some potential for error/fraud in the new evidence is introduced and a lack of evidence match does not automatically generate much disbelief. Uncertainty is reduced as some uncertainty shifts to belief and a very small amount shifts to disbelief. Plausibility is decreased, but belief is much greater.

In a second step, a second evidence item is added and evidence combination is performed. Belief grows substantially by combining pre-existing belief and uncertainty. Two belief sources grow belief. Disbelief has a very small decrease, uncertainty is reduced, and plausibility is relatively unchanged. Two weak evidence items can generate reasonable belief, but getting a very high belief may require a third evidence item.

Sensor maps may be designed to be correlated with each other; i.e., a stimulus that emits both a Market and Transactional cue which will activate correlated regions of the separate Market and Transactional topographic sensor maps. Activated neurons in the sensor maps may send stimuli to at least two different fusion maps. The primary fusion maps may have relatively localized response regions to the Market Segment, and the secondary fusion map may have larger activation regions. In both fusion maps, the response region architectures may be designed with both excitatory and inhibitory activation regions.

Thus, if a Market sensor fusion neuron receives an input from a Market sensor map that correlates very closely with its topographic area, it becomes active. Biological sensor fusion research shows that this activity is related to how closely matched the activating signal map location is to the fusion map location. If the stimulus corresponds to an external area farther away from the area to which the sensor fusion neuron is "tuned," then the stimulus actually inhibits activation of the fusion neuron. This promotes activation localization in the fusion layer; it "sharpens" the fusion response. This is very much like having a difference filter, in this case a Difference of Gaussians (DoG), which may operate on the sensor inputs to the sensor fusion maps.

While inputs from one sensor modality can cause a fusion neuron to have some response, fusion neurons only respond strongly when they receive near-simultaneous inputs from two or more different sensor modalities. In this case when they receive this multi-modality stimulus input, they respond much more than the sum of the two inputs would suggest; they respond with a very nonlinear strong activation. In short, these neurons actually require inputs from multiple sensors to become active.

The secondary Market sensor fusion network acts to provide persistent "context-dependent cueing" on the primary fusion topographic net. Market focused sensor stimuli activate both fusion networks. If an expected Market sensor signal disappears, the secondary fusion network retains its activation for a time, and sends signals that release inhibitions on the primary network. This makes it possible for the primary network to both respond to weaker sensor stimuli as well as to expand the area to which it would respond to weak stimuli. In practical terms, if the biological network is responding to a target that turns suddenly from its expected trajectory, or if the target attempts to camouflage its signal, the sensor fusion network's increased sensitivity helps it to maintain a target lock.

The "Greeks" may serve as tools modeled to perform risk management alerting. Each Greek is designed to measure the sensitivity of the value of a portfolio to a small change in a given underlying parameter. This function allows the component risks to be treated in isolation, and the portfolio rebalanced accordingly to achieve a desired exposure. "Delta Hedging" serves as a model that may be used. The Greeks in the Black-Sholes model follow the same functional flow for calculation for desirable property of financial models and serve as a cross collating element for modeling derivatives traders' transactions, including those who seek to hedge their portfolios from adverse changes in market conditions. For this reason, the Greeks, which are particularly useful for hedging delta, theta, and vega are well-defined for measuring changes in Price, Time and Volatility. Although rho is a primary input into the Black-Scholes model, the overall impact on the value of an option corresponding to changes in the risk free interest rate environment to date was generally considered insignificant and therefore higher-order derivatives involving the risk-free interest rate are not common. With the recent Libor transactions this function has the potential to serve as an early warning for interest rate volatility. The most common of the Greeks may be modeled as first order derivatives: Delts, Vega, Theta, and Rho. The second-order derivative of the value function Gamma may also be modeled. The remaining sensitivities in this list are common enough that they have common names, but this list is by no means exhaustive.

A fusion approach may work robustly over a wide range of possible use cases. Processing task allocations to the "integrator model devices" may be determined as well as to the Hadoop-enabled networked processors, identifying which units will perform Market position determination, Market report fusion, and target tracking/characterization. Particular attention is paid to developing the methods by which targets can be smoothly characterized while moving from the fields observed by one or more models to other models, and where target reporting transitions from one integration device to another. Existing algorithms can be readily incorporated for model position localization as well as target trilateralation.

GOTS and COTS components can be used to readily build a Situation Interpretation capability, including target characterization algorithms, methods for incorporating user and/or domain knowledge, and available interface components. An architecture may allow users the best possible interpretation of fused sensor data.

Exchange Data and Electronic Trade Service Functionality may provide user profiling capabilities through Implicit & Explicit Agents. In implicit profiling the Data Exchange may analyze a content user's view and push information to them based on their semantic analysis related to Market Area interests. In explicit profiling via user-defined Analytic software agents, users can create agents to automatically pull in information on areas of interest. Users may be able to launch composed agents created from the Hypothesis Generation functionality they've modeled to pull new information on areas of interest. Users can share agents in a collaborative environment, and the Market community can capture the "tacit knowledge" of its personnel through the management of the user agents.

Exchange Data and Electronic Trade Service Functionality may also include Content Organization and Generation (Taxonomy) capabilities, Taxonomy generation methodology based on user functionality and Oversight, Enforcement and Economist modeled concepts of taxonomies, Automatic identification and ingestion of existing taxonomy structure, Automatic identification methodology for taxonomy refinement given departmental and individual user feedback and scalability needs, Enhanced Knowledge Discovery and Analytic capabilities, Utilizing advanced indexing and Information Theory Inference Retrieval Capabilities, Hyperlinking, Collaboration in Communities of Interest, and the ability to established push content area "breaking news" to users upon selection of Advanced Search tabs and Agent Based Alerting.

The process of approving (validating), reclassifying (refuting and re-calculating) or denying (refuting) any number of FRIAR Code Options is impacted by several factors. This is not a linear classification task. In a classification task, the number of particular classes is typically well-known, and typically much smaller than the number of candidate FRIAR identified elements that would be matched to a given class type. Because classes can be described by combinations of "characteristic attributes," classification tasks can typically be performed by one of a number of well-known methods, e.g., statistical classifiers, neural networks, etc. However, the presently disclosed methods, systems, and apparatuses address the case of matching particulars—e.g., a given extracted FRIAR identified element (e.g., a person's name and financial event code) against a large set of reference FRIAR identified elements and/or individual transaction history. In this case, each reference FRIAR identified element is characterized uniquely by a set of particulars, not as a member of a given class. This means that a methodology other than that typically employed for classification tasks is required.

In an aspect, a set of extracted FRIAR identified elements and extracted transaction originator identified elements may be compared to a set of reference FRIAR identified elements associated with the same or similar codes using an appropriate rule set, until a sufficient confidence can be reached regarding whether an acceptable code decision can be made to accept, reject, or automatically reclassify a given code. In a further aspect, the process proceeds iteratively, with each extracted FRIAR identified element being compared against the set of reference FRIAR identified elements to generate a confidence level regarding the correctness or incorrectness of a given decision until a confidence threshold for an acceptable code decision has been reached.

In a further aspect, all the thresholds for making an acceptable decision are context-dependent. Frequently, there will be costs associated with reaching certain levels of adjudication parameter or approval in a given decision. Depending on the quality of available data, the number of competing FRIAR Code Options, the extent to which these FRIAR Code Options can be readily distinguished from each other based on the readily available data, and other factors, it may at times be more "costly" to achieve greater adjudication parameters in either or both validating and/or refuting any of the set of potential FRIAR Code Options. It may at times be possible to deny certain critical FRIAR Code Options more readily than it may be possible to authorize, reclassify an approval assertion. In all of these cases, the question of setting thresholds for an acceptable decision becomes paramount, as cost factors can rise rapidly as decision adjudication parameter requirements are increased. Thus, it is useful to have a means for making context-dependent thresholds for "acceptable decisions." In this manner, review by administrators and legal review is replaced by the described methods, reducing overall review time from days and weeks to nano-seconds.

The FRIAR Service approval/deny methods may comprise at least a FRIAR Code accumulation method or system for incrementally aggregating information until a satisfactory decision can be reached, where this method should yield both degrees of approval and denial for any given FRIAR Service, as well as to indicate when an aggregated FRIAR Code combination can authorize, reclassify or deny a given FRIAR Service, or map "Rules Conflict" related the specific FRIAR Service.

The difference between FRIAR Service approval and FRIAR Service deny is that the goal of FRIAR Service approval is to garner sufficient FRIAR Code to support a given (FRIAR identified element-verifying) match. The process should involve not only gathering evidential support, but also (i) ensuring that there are no substantive denials in the proposed verification, and (ii) there are no significant conflicts introduced by matches to other FRIAR Code, Transaction Originator, or Account referenced in the data sources. The process of FRIAR Service Code denial similarly garners sufficient FRIAR Code to support denial in a match, preferably with minimal approval and conflict.

Thus, the presently disclosed methods, systems, and apparatuses define a method, architecture, and system by which context-dependent critical decision thresholds can be achieved, i.e., formulating a means by which critical decision thresholds can be modified as a set of one or more external events or parameters, thus yielding context-dependent decision criteria, as a function of both account adjudication and aggregated ranking, which are defined herein.

The approach taken in the presently disclosed methods, systems, and apparatuses addresses those cases where various "FRIAR identified elements" can be described by means of feature vectors, where the feature vectors can take on population of additional, pre-specified data fields as need for additional FRIAR Code arises. Note that not all fields are filled at the beginning of the decision-making task, nor must all the fields necessarily be filled in order for a satisfactory decision to be reached. Additionally, the decision process is influenced through a Feedback Loop via human adjudication of reconciled Codes/Transactions.

The presently disclosed methods, systems, and apparatuses postulate a rule-based decision-making method for generating FRIAR Code Options based on preliminary information that can be ascertained either with regard to the initial assertion(s), and then gathering sufficient FRIAR Code to deny the majority of the FRIAR Code Options, while simultaneously approving, reclassifying or "validating" the FRIAR Service that is most correct.

In an aspect, a Dempster-Shafer algorithm is used. By way of example, a Structured Virtual Construct Dempster-Shafer (SVC-DS) may be used. The SVC-DS process produces a approval-set output for each iteration of the SVC-DS process (each successive step of pairwise FRIAR Code aggregation). This approval-set consists of the various initial and resultant FRIAR Code valuations (approval, denial, and re-classification, along with account adjudication). In addition, a conflict value can be produced after two or more FRIAR Code items are combined. This measures the disparity between the approvals that one FRIAR Code source might assert against the denial asserted by a different form of FRIAR Code. Thus, instead of having a scalar adjudication parameter value we have not less than a set of three distinct values (approval, denial, and re-classification), along with two others that are additive combinations of certain distinct values The goal of using the SVC-DS method is to provide support for a decision. That decision should rightly be made in the context of several different factors and with regard to the FRIAR identified element in question, potential classifications or matches of the FRIAR identified element, and considerations of both potential past as well as future history. In short, the decision-making process that the SVC-DS method supports is not static, rather decisions related to the Feedback Loop is made in context. It is to this end that the first aspect of the presently disclosed methods, systems, and apparatuses are specifically addressed.

The process of refuting FRIAR Code Options requires that a measure of denial be generated as well as approval in the leading FRIAR Code Options. Also, the leading FRIAR Code Options should mature into ones where there is minimal conflict; i.e., no strong indicators of both approval and denial. Further, when there are multiple competing FRIAR Code Options, and multiple small "FRIAR Code items" being used to form FRIAR Code "masses" in support of various FRIAR Code Options, and where there is also high likelihood of partial, incomplete, and even erroneous "FRIAR Code items" that will be found and used, there will be a great deal of ambiguity in the early processing stages. Thus, it is very reasonable to work with measures of re-classification, supporting both account adjudication and FRIAR Reasoning, as much as to work with the more certain statements regarding approval and denial. For these reasons, a Dempster-Shafer formalism alone is not always an appropriate starting place for grounding the methods discussed in the presently disclosed methods, systems, and apparatuses.

In an aspect, the SVC model framework is applied to the managing Dempster-Shafer formalism stimulus information for node responses by: (1) using a tractable statics and algorithm management for computing the modeled estimate of the most probable stimulus to have generated an observed single or multiple trained or modeled response, given a prior distribution model over the FRIAR reasoning stimulus; (2) using a Gaussian approximation to the FRIAR reasoning feature vector distribution that can be used to quantify the fidelity with which various stimulus features are encoded; (3) using a method for estimating the mutual information between the FRIAR reasoning feature vector distribution and spike trains emitted by a neural cluster; and (4) using a framework for the detection of FRIAR reasoning feature vector distribution change events or times (the time at which the FRIAR reasoning feature vector distribution undergoes a change in mean or variance) by establishing limits and boundaries over the FRIAR reasoning feature vector distribution.

This combination of support elements makes the SVC-Dempster-Shafer method suitable for FRIAR Code aggregation within the overall decision-support architecture. The use of the Least Squares Fit method along with the SVC-DS allows for linear rules based organization and ranking of explicit pairwise combination of approvals, along with measures of re-classification and denial in a given assertion.

A challenge in using a method such as SVC-DS in conjunction with the Least Squares Fit is that the initial approval-set values are readily defined in an "a priori" sense as are the normal distributions used in associated cluster based classifications. Much like work with neural networks, which can be trained when there are sufficient examples "spanning" the multiple dimensions for FRIAR Code combinations, it is reasonably assured of complete FRIAR Code-space coverage required for good training. Therefore, means for defining not only initial approval, but also denial and re-classification resulting from any initial FRIAR Code form may be applied, prior to the FRIAR Code aggregation.

Because one of the strengths of the SVC-DS method is that it is intrinsically well-suited for dealing with aggregation of partial or incomplete FRIAR Code, a method is employed that not only defines the relative initial values of each specific type of FRIAR Code, and also the value of "partial" FRIAR Code of each type, but also the means by which denial is associated with a given FRIAR Code-type when approval falls off. This may be determined prior to aggregating a particular FRIAR Code type with other (either initial and singular, or previously aggregated) FRIAR Code. The present the presently disclosed methods, systems, and apparatuses described herein address this issue.

Account adjudication, as used in this approach defines the parameters and certainty that a given assertion is true related to the approval. Additionally the degree to which it is credible that a given assertion could come from Trusted Knowledge Base information is directly proportional to degree of accuracy in the account adjudication for approval re-classification, and denial. The presence of a re-classification measure makes it possible to express both account adjudication and doubt. It is also a way to express what is not known about a given Transaction Originator, Account, or FRIAR Coding situation. This makes it possible to identify and account for FRIAR Code conflicts; as an example, when one FRIAR Code element supports the approval that a transaction is authorized and other FRIAR Code says that the may be fraudulent. When conflicts increase, the need to gather/assess more FRIAR Code for verification increases.

In the case of FRIAR identified element matching, high confidence means that it is directly associative that a given FRIAR identified element matches to some specific known, reference FRIAR identified element. The difference between this case and the previous is that in the first, the reference FRIAR identified element is actually the one being posited for FRIAR allowable identified element verification, and the verification information can come from multiple disparate sources, which may collectively confirm different attributes associated with the FRIAR identified element. The process focuses on accumulating sufficient adjudication parameter in confirming information provided by potentially disparate sources against the information provided about the FRIAR identified element whose FRIAR allowable identified element is being verified. In contrast, FRIAR identified element matching assumes that the FRIAR identified elements who could be matched (the reference FRIAR identified elements) are largely already known, and that sufficient already-vetted information is attached to each of these so that the task is more one of matching the given extracted FRIAR identified element (the one being matched) against one of these reference FRIAR identified elements through the use and extension of dedicated rules. There would preferably be some attributes or context associated with the extracted FRIAR identified element, and there would preferably be a larger set of attributes associated with each reference FRIAR identified element. Preferably, also, the attributes and/or context associated with the extracted FRIAR identified element form a subset of the attributes and/or context associated with the reference FRIAR identified element, to facilitate the matching process.

In an aspect, a rule-based method for performing FRIAR Code-based decision-making on a computer-based system comprising at least one processor is provided, wherein said at least one processor: (a) generates a set of FRIAR Code Options based on preliminary information regarding an initial assertion data, and (b) applies a rule set to each FRIAR Code option to generate a result selected from the group consisting of: (b1)) accumulate and aggregate further information to apply to a FRIAR Code option, (b2) render an automatic reclassification of a FRIAR code option, (b3) generate an auto-accept decision for a FRIAR code option, and (b4) generate auto-deny. A Structured Virtual Construct (SVC) Dempster-Shafer (SVC-DS) output where the estimate of "Plausibility and Potentiality" proves to be a good measure of limitation and control of trained data in variety of model formats, including the ability to tractably perform optimal nonlinear feature vector reconstruction given the activity of ensembles of interacting rules models or some similarly focus function is essential and may be applied to each FRIAR code option to generate the result.

In an aspect, the initial assertion is related to the method of utilizing neural computational logic, statistically motivated algorithms and a computationally efficient artificial intelligence management approach to nonlinear dimensionality reduction of options that has form, fit, and functionality preserving properties and connection to clustering for representation of high-dimensional The set of reference FRIAR identified elements in each of the foregoing systems may be obtained from a Knowledge Base that is stored on computer readable medium, or may be generated dynamically through reference to databases or other sources. Moreover, each of the reference identified elements are maintained in the same Knowledge Base or separately along with outside data sets. In an aspect, the system comprises a Knowledge Base comprising reference FRIAR identified elements, a Knowledge Base comprising Reference Transaction Originator FRIAR identified elements, and/or a Knowledge Base comprising Reference Account FRIAR identified elements.

The system may further comprise one or more data sources configured to enhance the FRIAR identified elements in the form of either feature vector elements and/or corrections to feature vector elements for either of the reference FRIAR Transaction Originator, Account, or FRIAR Code identified elements and the extracted FRIAR identified elements, thereby generating a large indefinite quantity of augmented feature vectors for each of the large indefinite quantities of extracted FRIAR identified elements and/or the reference FRIAR identified elements. These enhancements may range from a simple correction in a transaction participant address to the complete addition of a financial term glossary. The data sources may be any computer-accessible source comprising data relevant to the extracted FRIAR identified elements. Exemplary data sources include, but are not limited to, data compiled and maintained by Dunn and Bradstreet, Axim, Thompsons Routers, WSJ, Lexus Nexus, and other authorized sources. In an aspect, the one or more data sources may be stored on a computer-readable medium, and/or configured to provide data for: (1) a set of reference Transaction Originator identified elements, Account identified elements, and FRIAR identified elements, and (2) a set of enhanced reference FRIAR identified elements configured to augment a large indefinite quantity of feature vectors associated with each of the large indefinite quantity of extracted FRIAR identified elements, thereby generating a large indefinite quantity of augmented feature vectors for each of the large indefinite quantity of extracted FRIAR identified elements.

In most cases it is likely that any assertion posed by the rules configuration formalism will need to withstand queries regarding its believability. Bayesian methods may be used in this area. Alternatively, the Dempster-Shafer (SVC-DS) method may also be used.

A FRIAR Code selection processor function may further comprise: a FRIAR Service generator function configured to generate one or more FRIAR Code Options about the extracted or referenced FRIAR identified element; and a FRIAR Service approval processor function configured to authorize, reclassify, and/or deny the generated FRIAR Code Options to generate a total FRIAR Code function, wherein the total FRIAR Code function is computed uniquely and distinctively for each FRIAR Service regarding a potential match between an extracted FRIAR FRIAR element and a reference FRIAR identified element.

The FRIAR code selection processor function may be further configured to apply a rule set to generate a large indefinite quantity of FRIAR Code Options and to gather data to authorize, reclassify or deny the generated FRIAR Code Options.

A threshold processor function is involved in all measurable analytic functions and may be further configured to define the context-dependent threshold for an acceptable code decision by applying an auditable rule set using an aggregated ranking calculation and account adjudication calculation.

One embodiment of the invention is implemented as a program product for use with a computer system such as, for example, the computing environment 100 shown in FIG. 1 and described below. In this embodiment, the FRIAR system may be embodied on a server and may be accessed and controlled by a user on a client device. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, solid state storage devices); and (iii) information conveyed to a computer by a communications medium, such as through a computer or telephone network, including wireless communications.

The latter embodiment specifically includes information downloaded from the Internet and/or other networks. Such signal-bearing media, when carrying computer-readable instructions that direct the functions of the present invention, represent embodiments of the present invention. In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in one or more specific embodiments of the invention. However, it should be appreciated that any particular program nomenclature that follows is used merely for convenience, and thus the invention should not be limited to use solely in any specific application identified and/or implied by such nomenclature. In this regard, references to particular definitional languages, such as HTML and XML, are illustrative in nature and do not serve to limit the claims. It is broadly contemplated that the invention is applicable regardless of the particular schema and/or language used to define network resource content.

Figure 1:
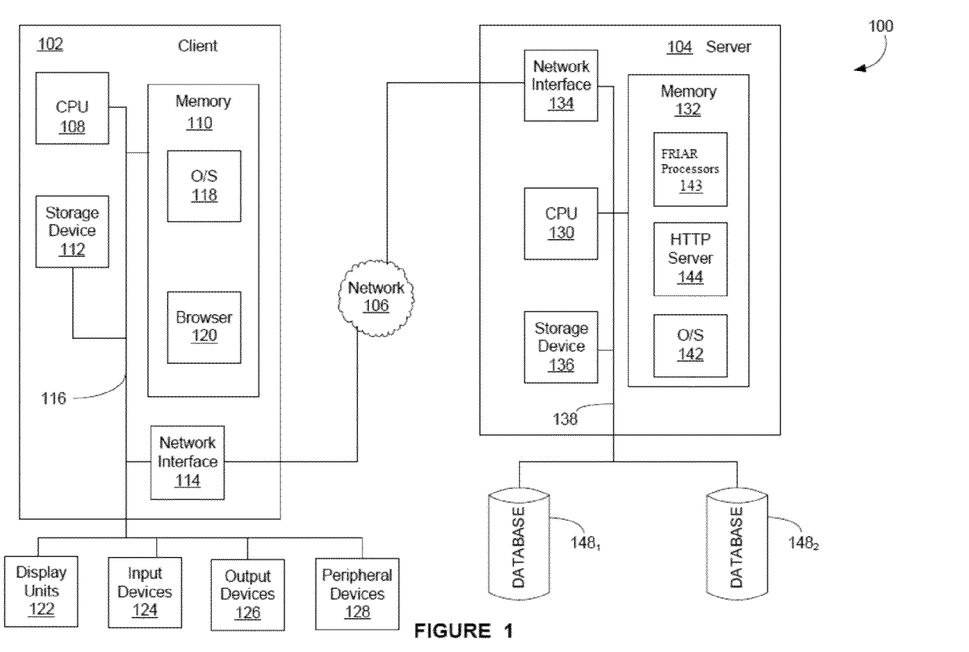
FIG. 1 is a block diagram illustrating an exemplary computing environment 100, in accordance with an embodiment of the present invention

Turning now to FIG. 1, a block diagram illustrating an exemplary computing environment 100, in accordance with an embodiment of the present invention, is shown. In general, the computing environment 100 includes a client (e.g., a user's) computer 102, and a server computer 104. The client computer 102 and the server computer 104 may be components of the same computer system or may be connected via a network 106, such as the Internet. As shown, the client computer 102 includes a central processing unit (CPU) 108 connected to a memory 110, a storage device 112, and a network interface 114 via a bus 116. The CPU 108 is included to be representative of a single CPU, multiple CPUs, a single CPU having multiple processing cores, and the like. The storage device 112 stores application programs and data for use by the client computer 102. Examples of the storage device 112 include one or more hard-disk drives, flash memory devices, optical media and the like.

The client computer 102 may be connected to the data communications network 106 (e.g., a local area network, which itself may be connected to other networks such as the internet) using the network interface 114. The memory 110 can be one or a combination of memory devices, including random access memory, nonvolatile or backup memory (e.g., programmable or flash memories, read-only memories, etc.). Illustratively, the memory 110 of client computer 102 stores an operating system 118 used to manage hardware and software executing on the client computer 102. As shown, memory 110 also includes a browser program 120 which, when executed by CPU 108, provides support for navigating between various servers and locating network addresses at one or more of servers (e.g., server computer 104).

The client computer 102 may be connected to one or more display units 122, input devices 124, output devices 126 and peripheral devices 128. The display units 122 may be internal or external monitors, television screens, handheld device displays, and the like. The input devices 124 may be any one of a keyboard, mouse, track-ball, stylus, mouse pad, mouse button, joystick, scanner or the like. The output devices 126 may be any one of a monitor, printer, plotter, copier or other output device. The peripheral devices 128 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like.

Similar to the client computer 102, the server computer 104 may include a CPU 130, a memory 132, a network interface device 134, and a storage device 136, coupled via a bus 138. The memory 132 may be a random access memory sufficiently large to hold the necessary programming and data structures that are located on the server computer 104. As shown, the memory 132 stores an operating system 140 used to manage server hardware and software executing on the server computer 102. Illustratively, the memory 132 also includes a hypertext transfer protocol (http) server 144 configured to service requests from the client computer 102. For example, the http server 144 may respond to requests for access to electronic resources (e.g., HTML documents, network information, and the like) residing on the server computer 104. However, one of ordinary skill in the art will recognize that the http server 144 is merely illustrative and embodiments of the invention may be adapted to support both known and unknown protocols.

The programming and data structures of the http server 144 may be accessed and executed by the CPU 130 as needed during operation. The server computer 104 may connect to the network 106 using the network interface device 134 (e.g., an analog modem, a wired network card, or a wireless network device).

In one embodiment, users may interact with the server computer 104 using a graphical user interface (GUI). In a particular embodiment, GUI content may comprise HTML documents (i.e., web pages) rendered on the display unit 122 coupled with the client computer 102 using the browser 120. In one embodiment, the web pages may include pages that allow a user to {design, manipulate, execute and monitor the performance of various business processes (i.e., workflows)}.

The memory 132 may further include various FRIAR processors 143 (program modules), such as a FRIAR Code processor, a FRIAR Transaction Originator Code processor, a FRIAR Account Code processor, a FRIAR Code selection (ACS) processor, a FRIAR Code threshold processor, and a decision processor, as described herein. The FRIAR processors may comprise a software application configured to provide the ability (e.g., via the GUI) to control the operation of the system and set desired areas for monitoring or decision-making.

Accordingly, the server computer 104 may be coupled to a plurality of databases $148_1$, $148_2$ which may include a relational database $148_1$ that is queried using an SQL query, or an XML database $148_2$ queried using an XML query. These databases may for example contain reference identified FRIAR elements and enhancement data. The invention, however, is not limited to any particular physical database storage mechanism and may readily be extended to operate on other such mechanisms, whether currently known or unknown. While the databases $148_1$, $148_2$ are illustrated as being external to the server system, it is noted that the databases $148_1$, $148_2$ may exist on a local storage device (e.g., storage device 136) of the server computer 104, or may be accessed over the network 106.

Figure 2:
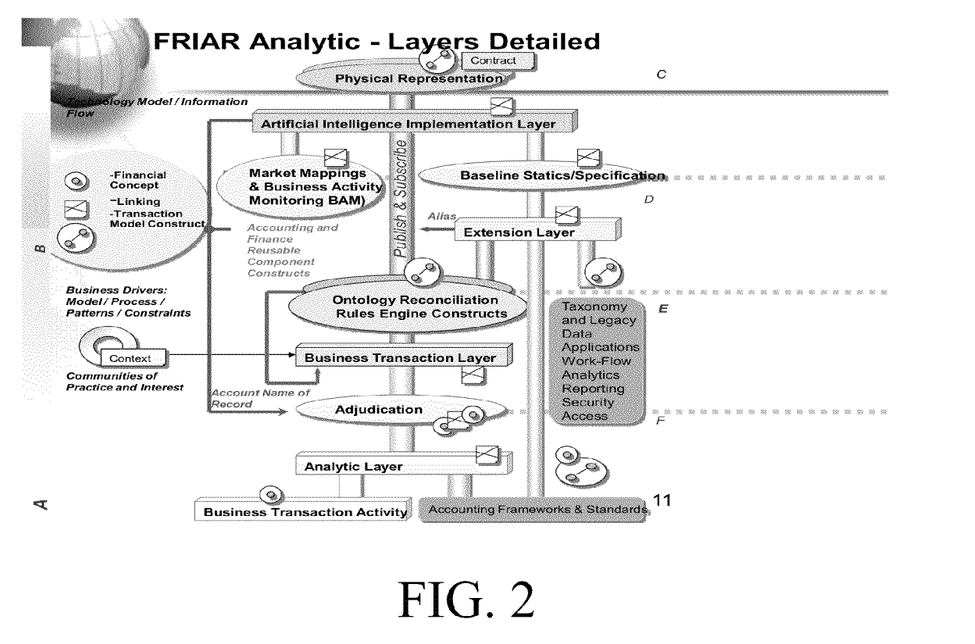
FIG. 2 is a block architecture diagram of a system for performing Financial Code-based decision-making

FIG. 2 is a block architecture diagram of a system for performing Financial Code-based decision-making through the identification, modeling and aggregation of common Market elements for comparative analysis and scoring of contextual ontology's of models augmented by quantification of primary assumptions which are used in finance to estimate the probability distribution of gains and losses on a disparate pool of financial transaction decision making according to one aspect of the presently disclosed methods, systems, and apparatuses.

(A) Financial Transaction Business Activity Ontology Modeling. (B) Financial Transaction and Business Activity Processing. (C) Transaction/Presentation layers including Finance Governance and Accounting Specifics such as Mandatory versus Optional rules constructs: Financial Elements versus attributes; Automated Statistical baselines versus Manual Data assessment and Masking; Work-Flow Routing & Taxonomy Packaging; and financial service parameter partitioning. (D) Authorization and Security authentication and identification layers including Role-Process and models; Financial Standards & Framework Model Adoption; financial system qualifier to Object Orientation Breakout; Thesaurus Ontology and Taxonomy Assignment; and Financial Transaction Interchange Mapping. (E) Financial and Accounting Technology Requirements layers, including Business Rules and Patterns; Atomics & Alerts; Structured Model Resolution and transaction adjudication; Workflow/Process identification models; Mandatory vs Optional; and Sub-set Application Layer. (F) Semantics, Semiotic and Logic Layer, including Business, Temporal, Spatial and Transactional Context; Use Case Models and Work-Flow Sequence; Authoritative Sources; Business Activity and Reporting; Concepts Registration; Classification/Categorization Assignment Ontology/Taxonomy Placement and social patterning in financial markets which are extrapolated across disparate Market Channels.

Figure 3:
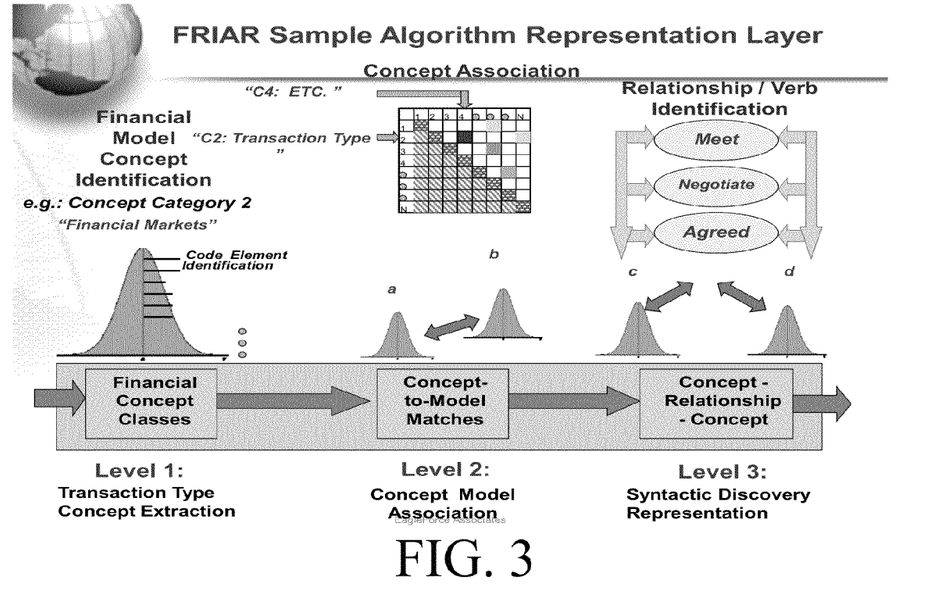
FIG. 3 is a block Financial Transaction scoring architecture diagram for performing Financial Code-based decision-making.

FIG. 3 is a block Financial Transaction scoring architecture diagram for performing Financial Code-based decision-making through the identification, modeling, aggregation and matching of common Market elements and Concept Relationships for comparative analysis, situation interpretation capability through target characterization algorithms and methods for the scoring of contextual ontology's of models including implicit and explicit profiling and semantic analysis of related market interest.

The approach is designed to extend the capabilities of FRIAR transaction adjudication and review well beyond existing functionality with best of breed technology. The system is designed to control data movement and migration with a novel ability to write it to various targets. A graphical user interface may be used to define and manage data maps for relational and non-relational data sources as personal metadata profiles are targeted and database row tests are performed. By performing a row test on a data map, the source data can be viewed formatted into a Data Dictionary for conversion into objects. (For CMS this includes Imbedded Variable Length record fields). The FRIAR Data Dictionary system component manages data maps for non-relational files and tables and maintains them in the DATAMAPS file. This portion of the system handles bulk data extraction requests from the Analytic Layer for preparation for Adjudication. If the FRIAR data source or target is on a system that is remote from the one the system is using, bulk data can be extracted from and loaded to, for example and without limitation, the following types of databases and files: Relational databases and flat files on Linux, UNIX, and Windows; DB2 tables and flat files on i5/OS; Relational databases, non-relational databases, and sequential data sets on MVS; Microsoft SQL Server; Oracle; and Sybase tables on Linux, UNIX, or Windows.

The invention is not limited to the particular embodiments illustrated in the drawings and described above in detail. Those skilled in the art will recognize that other arrangements could be devised, for example, Examples. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the invention has been described with reference to specific illustrative embodiments, modifications and variations of the invention may be constructed without departing from the spirit and scope of the invention as set forth in the following claims.

We claim:

1. A system for performing FRIAR Code-based adjudication comprising:
   a FRIAR Code processor, configured to match an extracted FRIAR identified element against a Knowledge Base set (KBS) of reference FRIAR identified elements (RFIE);
   a FRIAR Transaction Originator Code processor, configured to match an extracted FRIAR identified element associated with Transaction Originator identification against a Knowledge Base set (KBS) of reference FRIAR Transaction Originator identified elements (RF-TOIE);

a FRIAR Account Code processor, configured to match an extracted FRIAR identified element associated with the Account Name of Record (ANR) against a Knowledge Base set of reference FRIAR Account identified elements (RMAcIE);

a FRIAR Code selection (ACS) processor for defining a rule set to be applied to the extracted FRIAR identified element and the large indefinite quantity (LIQ) of reference FRIAR identified elements and configured to generate a total FRIAR Code identification function;

a FRIAR Code threshold processor configured to generate a context-dependent threshold for an acceptable code decision; and a decision processor, configured to compare the total FRIAR Code functions to the context-dependent threshold and determine whether to accumulate and aggregate further FRIAR Code aggregation, provide system alerts, render an automatic reclassification, or to generate an auto-accept/auto-deny decision-result.

2. A system for performing FRIAR Code-based adjudication as claimed in claim 1, wherein the FRIAR Code processor is configured to further accumulate and aggregate a set of enhanced reference FRIAR identified elements for matching against each of the extracted FRIAR identified elements; and further comprising one or more data sources, configured to provide enhancements in the form of feature vector elements or corrections to feature vector elements for reference FRIAR identified elements and the extracted FRIAR identified elements, thereby generating augmented feature vectors for each of the extracted FRIAR identified elements and/or the reference FRIAR identified elements.

3. A system for performing FRIAR Code-based adjudication as claimed in claim 1, wherein the FRIAR Code selection processor further comprises: a FRIAR Service generator configured to generate one or more FRIAR Code Options about the extracted or referenced FRIAR identified element; and a FRIAR Service approval processor configured to authorize, reclassify, deny and/or reclassify the generated FRIAR Code Options to generate a total FRIAR Code function which is computed uniquely and distinctively for each FRIAR Service regarding a potential match between an extracted FRIAR identified element and a reference FRIAR identified element.

4. A system for performing FRIAR Code-based adjudication as claimed in claim 3, wherein the rule set is used both by the FRIAR Service generator to generate a large indefinite quantity of FRIAR Code Options and by the FRIAR Service approval processor to gather data to authorize, reclassify or deny the generated FRIAR Code Options.

5. A system for performing FRIAR Code-based adjudication as claimed in claim 1, wherein the threshold processor is further configured to use the rule set to define the context-dependent threshold for an acceptable decision using an aggregated ranking calculation and account adjudication calculation.

6. A system for performing FRIAR Code-based adjudication, as claimed in claim 2, further comprising: a reconciliation processor, configured to: acquire additional FRIAR Code information from the one or more data sources, according to the rule set provided by the FRIAR Code selection processor, for the extracted FRIAR identified element and each of its associated linear and non-linear matches to a reference FRIAR identified element or augmented reference FRIAR identified element; evaluate the linear and non-linear matches and determine if additional FRIAR Code is required to evaluate as linear.

7. A system for performing FRIAR Code-based adjudication as claimed in claim 1, wherein the FRIAR Code processor is configured to accumulate FRIAR Codes so that the FRIAR Codes are traceable.

8. A system for performing FRIAR Code-based adjudication as claimed in claim 1, wherein each of the extracted FRIAR identified elements and reference FRIAR identified elements further comprise a large indefinite quantity of feature vectors.

9. A system for performing FRIAR Code-based adjudication as claimed in claim 8, wherein all of the feature vectors of the reference FRIAR identified elements are fully populated with a large indefinite quantity of element values and if element values are unfilled, probability value is placed on the adjudication threshold relative to the degree and criticality of the non-populated element.

10. A system for performing FRIAR Code-based adjudication as claimed in claim 8, wherein some of the large indefinite quantity of feature vectors comprises a large indefinite quantity of vector elements.

11. A system for performing FRIAR Code-based adjudication as claimed in claim 8, wherein the FRIAR Code processor is configured to obtain additional element values for the large indefinite quantity of reference FRIAR identified element feature vectors.

12. A system for performing FRIAR Code-based adjudication from a set of data elements, comprising:

a large indefinite quantity of extracted FRIAR identified elements about which a decision will be made for each extracted FRIAR identified element;

wherein each extracted FRIAR identified element has associated with it a large indefinite quantity of feature vectors, each having a large indefinite quantity of feature vector elements;

a set of reference FRIAR identified elements for matching against each of the large indefinite quantity of extracted FRIAR identified elements;

a set of enhanced reference FRIAR identified elements stored on a computer readable medium;

one or more data sources stored on a computer readable medium, configured to provide enhancements in the form of feature vector elements or corrections to feature vector elements for either or both the reference FRIAR identified elements and the extracted FRIAR identified elements, thereby generating augmented feature vectors for each of the extracted FRIAR identified elements or the reference FRIAR identified elements;

at least one processor programmed to perform: a) a FRIAR Code processor function configured to compare the large indefinite quantity of augmented feature vectors associated with each of the large indefinite quantity of extracted FRIAR identified elements against a large indefinite quantity of feature vectors for the set of reference FRIAR identified elements or the set of augmented reference FRIAR identified elements, and b) a threshold processor function configured to generate a context-dependent threshold for an acceptable decision.

13. A system for performing FRIAR Code-based adjudication from a set of data elements as claimed in claim 12, further comprising a FRIAR Code selection processor for defining a large indefinite quantity of rule sets to be applied to each of the large indefinite quantity of extracted FRIAR identified elements and the large indefinite quantity of reference FRIAR identified elements and configured to generate the initial set of extracted FRIAR identified elements.

14. A system for performing FRIAR Code-based adjudication from a set of data elements as claimed in claim 13, wherein the FRIAR Code selection processor further comprises: a FRIAR Service generator configured to generate one or more FRIAR Code Options about each of the large indefinite quantity of extracted FRIAR identified elements; and a FRIAR Service approval processor configured to authorize, reclassify, deny and/or reclassify the generated FRIAR Code Options to generate the initial set of extracted FRIAR identified elements.

15. A system for performing FRIAR Code-based adjudication as claimed in claim 14, wherein the rule sets are used both by the FRIAR Code Options generator to generate a large indefinite quantity of FRIAR Code Options and by the FRIAR Code processor to gather data to authorize, reclassify or deny the generated FRIAR Code Options.

16. A system for performing FRIAR Code-based adjudication as claimed in claim 12, wherein the threshold processor is further configured to: use the rule sets to define the context-dependent threshold for an acceptable decision using an aggregated ranking calculation and account adjudication calculation.

17. A system for performing FRIAR Code-based adjudication from a set of data elements, as claimed in claim 12, wherein the set of augmented reference FRIAR identified elements include various permutations of the large indefinite quantity of reference FRIAR identified elements, and wherein the set of augmented reference FRIAR identified elements is larger than and inclusive of the set of reference FRIAR identified elements.

18. The system of claim 1, further comprising a FRIAR Account Code event (FACE) processor, configured to generate FACE profiles to track FRIAR outcomes and trends.

19. The system of claim 1 further comprising a user interface configured to permit human feedback to enhance automated system learning.

* * * * *